United States Patent [19]

McKenzie et al.

[11] Patent Number: 5,733,954
[45] Date of Patent: Mar. 31, 1998

[54] EPOXY RESIN CURING AGENT MADE VIA AQUEOUS DISPERSION OF AN EPOXIDE AND AN IMIDAZOLE

[75] Inventors: Taun L. McKenzie, North St. Paul; Allen L. Griggs, St. Paul, both of Minn.

[73] Assignee: Minnesota Mining and Manufacturing Company, St. Paul, Minn.

[21] Appl. No.: 572,309

[22] Filed: Dec. 14, 1995

[51] Int. Cl.$^6$ .................................................. C08L 63/00
[52] U.S. Cl. .................... 523/414; 525/504; 525/526
[58] Field of Search .................... 525/504, 526; 523/414

[56] References Cited

U.S. PATENT DOCUMENTS

| | | | |
|---|---|---|---|
| 3,756,984 | 9/1973 | Klaren et al. | 260/47 |
| 4,446,257 | 5/1984 | Kooijmans et al. | 523/403 |
| 4,588,617 | 5/1986 | Oka | 523/414 |
| 5,077,355 | 12/1991 | Nagase et al. | 525/526 |
| 5,134,239 | 7/1992 | Bertram et al. | 546/112 |
| 5,212,263 | 5/1993 | Schreffler | 525/533 |
| 5,357,008 | 10/1994 | Tsai et al. | 525/526 |
| 5,407,978 | 4/1995 | Bymark et al. | 523/457 |
| 5,465,910 | 11/1995 | Nakatsuka et al. | 525/534 |
| 5,554,714 | 9/1996 | Murio et al. | 525/524 |

FOREIGN PATENT DOCUMENTS

| | | | |
|---|---|---|---|
| 672 220 | 5/1990 | China | C07D 233/60 |
| 0 157 410 | 10/1985 | European Pat. Off. | A61K 31/785 |
| 0325146A2 | 7/1989 | European Pat. Off. | |
| 0 496 163 | 7/1992 | European Pat. Off. | C08G 59/10 |
| 59-155421 | 9/1984 | Japan | C08G 59/14 |
| 61-111323 | 5/1986 | Japan | C08G 59/50 |
| 61-268721 | 11/1987 | Japan | C08G 59/50 |
| 4-31420 | 2/1992 | Japan | C08G 18/58 |
| 1204834 | 9/1970 | United Kingdom. | |
| 2135316 | 8/1984 | United Kingdom. | |

OTHER PUBLICATIONS

"1, 3–Dialkylimidazolium Salts as Latent Catalysts in the Curing of Epoxy Resins", Journal of Polymer Science: Polymer Letters Edition, vol. 21., pp. 633–638, 1983.

*Primary Examiner*—Randy Gulakowski
*Attorney, Agent, or Firm*—Daniel C. Schulte

[57] ABSTRACT

The present invention provides a novel method for preparing a novel latent curing agent composition suitable for curing epoxy resin compositions. The present invention also provides the novel latent curing agent compositions.

12 Claims, No Drawings

EPOXY RESIN CURING AGENT MADE VIA AQUEOUS DISPERSION OF AN EPOXIDE AND AN IMIDAZOLE

FIELD OF THE INVENTION

The present invention provides a novel method for preparing a novel latent curing agent composition suitable for curing epoxy resin compositions. The present invention also provides the novel latent curing agent compositions.

BACKGROUND OF THE INVENTION

Imidazole/epoxy adducts have found utility in curing agent mixtures for thermosetting epoxy resin compositions having improved pot life or shelf life at ambient temperatures, yet having acceptable cure speed at elevated application temperatures. U.S. Pat. No. 3,756,984, Klarens, et. al, assigned to Shell Oil Company describes the preparation of such adducts in their neat form.

The versions of imidazole/epoxy adducts which are solids at room temperature, when used with co-curatives such as dicyandiamide, and bisphenolic curing agents such as DEH 87 from Dow Chemical provide solid epoxy resin based powder coating compositions which have reasonably good shelf life. Examples of these compositions are described in European Patent Application EP 0325 146 A2 published on Jul. 26, 1989, Lampton, et. Al., (Dow Chemical) and in U.S. Pat. No. 5,407,978, Bymark, et al., assigned to 3M Company. However, such powders, if not used within a few months, must be discarded due to incipient pre-cure which progresses at a slow rate in these powders during normal storage. Further, the shelf life of these powder coatings can be shortened dramatically if during storage or transit, these powders are subjected to temperatures approaching 40° C. or higher for even a short time. Air conditioned warehouses and refrigerated containers are routinely utilized at significant expense when storing or shipping these powder coatings so as to prevent excessive pre-cure and to maximize their shelf life.

Attempts to improve upon the room temperature latency of imidazole curing agents has included forming quaternary imidazolium salts by reacting them with acids or metal salts having weak nucleophilic anions which, in effect, block the active sites until the quaternary salt is thermally or chemically decomposed. U.S. Pat. No. 5,134,239, Bertram, et al., assigned to Dow Chemical, describes this work. These catalysts tend to be expensive and also leave undesirable decomposition residues in the curing composition.

In an alternate approach, an article titled "1,3-Dialkylimidazolium Salts as Latent Catalysts in the Curing of Epoxy Resins" published in the Journal of Polymer Science: Polymer Letters Edition, Vol. 21,633–638 (1983) describes using a heat labile group to block the active site, and thus extend the shelf life, while maintaining acceptable reactivity at cure temperatures. However, temperatures around 200° C. were required to initiate the decomposition of the dialkylimidazolium halides to the reactive species investigated in this work. These activation temperatures are too high for many curing applications.

Another approach is to prepare imidazole/metal salt complexes, such as are disclosed in United Kingdom Patent Specification 1,204,834, but these tend to be crystalline and are poorly soluble in epoxy resins which deleteriously affects their activity in curing epoxy compounds. Also undesirable metal salt residues remain in the cured compositions and may adversely effect electrical properties, corrosion inhibiting properties and thermal stability properties of the cured resin systems.

United Kingdom Patent 2,135,316 offers improved solubility in epoxy resins by adducting imidazoles with monofunctional epoxies such as phenyl glycidyl ether before complexing with metal salts. However, undesirable metal salt residues are still present. Additionally, these compounds tend to be expensive.

SUMMARY OF THE INVENTION

The present invention relates to novel methods for production of latent curing agent compositions comprising imidazole/epoxy adducts, in the presence of water, which are excellent curing agents for epoxy resins. A curing agent composition is considered to be latent if, when mixed with a diglycidyl ether of bisphenol A at 98 parts by weight epoxy compound to 2 parts by weight curing agent composition, a viscosity increase of no more than 2% per hour is observed at a temperature of 40° C. Furthermore this invention relates to novel latent curing agent compositions comprising imidazole/epoxy adducts prepared by this method. We have discovered that the reaction of epoxy groups with imidazole compounds in the presence of at least 5% water based on the total composition weight, at temperatures not exceeding 110° C., provides imidazole/epoxy adduct compositions which contain significant amounts of the reaction product of two epoxy groups with one imidazole compound to form internal quaternary imidazolium segment(s). We believe the water provides protons and hydroxide counter ions which serve to stabilize these internal quaternary imidazolium segment(s) at temperatures below 110° C. The imidazole/epoxy adduct compositions of the invention are solids at ambient temperatures and are surprisingly latent in epoxy compounds at temperatures below about 50 degrees C. as measured by rate of viscosity increase in curable compositions. Equally surprising, the imidazole/epoxy adduct compositions of the invention will cure an epoxy resin at 240° C. to a thermoset condition at a rate comparable to commercially available imidazole adduct curing agent compositions which are not latent.

The dried curing agents of this invention are solids at room temperature and are preferably pulverized to a powder before use in epoxy resin curing mixtures.

The latent curing agent compositions of this invention are suitably used as curing agents for epoxy resin compositions. More suitably, the reaction products of this invention are used in epoxy resin curing compositions which are cured at elevated temperatures. These curing agent compositions may be used alone or in combination with other co-curing agents. The reaction products of this invention are particularly suitable for use with co-curing agents in epoxy powder coatings.

The curing agent compositions may be used in various epoxy resin curable compositions including powder coatings, two component potting resins and adhesives, and one component curable compositions such as hot melt adhesives and mastics.

The present invention provides a single step method of preparing a curing agent composition(s) comprising the steps of:

(a) providing a mixture having a temperature range of about 15 to about 50 degrees C., the mixture consisting essentially of:

(i) an epoxy compound(s) having an average of at least one vicinal epoxy group per molecule and an epoxy equivalent weight of less than about 350, wherein if the epoxy compound is water insoluble it must have a ball and ring softening point of about 40 degrees C. or less;

(ii) an imidazole compound(s) selected from the group consisting of

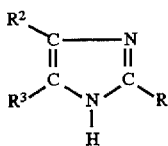

wherein
$R^1$ is independently selected from the group consisting of hydrogen, aryl radicals, alkyl radicals comprising up to about 18 carbon atoms, and cycloalkyl radicals comprising up to about 18 carbon atoms;
$R^2$ is independently selected from the group consisting of hydrogen, aryl radicals, alkyl radicals comprising up to about 18 carbon atoms, and cycloalkyl radicals comprising up to about 18 carbon atoms;
$R^3$ is independently selected from the group consisting of hydrogen, aryl radicals, alkyl radicals comprising up to about 18 carbon atoms, and cycloalkyl radicals comprising up to about 18 carbon atoms;
wherein $R^2$ and $R^3$ may alternatively together form a fused ring structure; and (iii) at least about 5 percent by weight water based on the total weight of components of elements (i) plus (ii) plus (iii);

(b) allowing the mixture to react with agitation and with optional heating in order to accelerate the reaction, wherein the amount of water added in step (a) and the amount of heat optionally added in step (b) is such that the mixture temperature does not exceed about 110 degrees, in order to yield a curing agent composition in water, and wherein the amount of water added in step (a) is such that at least about 5 weight percent water is present based upon the total weight of the mixture during step (b);

(c) optionally extracting from the mixture unreacted water soluble imidazole compounds;

(d) optionally repeating step (c) one or more times;

(e) removing the water at a temperature not to exceed about 110 degrees C. to yield the curing agent composition;

wherein the total amount of epoxy compound(s) and imidazole compound(s) used according to the method is such that about 0.55 to about 1.3 equivalents of secondary amino group of the imidazole compound(s) per equivalent of epoxy group are used.

$R^2$ and $R^3$ may alternatively together form a fused ring structure selected from the group consisting of fused aromatic ring structures, fused heterocyclic ring structures, and fused alicyclic ring structures.

The present invention also provides the curing agent composition(s) formed according to the single step method.

Preferably the amount of water used in the single step method ranges from about 14 to about 25 percent by weight based upon the total weight of components of elements (i) plus (ii) plus (iii).

Preferably the epoxy compound(s) has at least one aromatic ring as part of the epoxy compound(s) structure, and wherein the epoxy compound(s) has an average of at least one vicinal epoxy group per molecule.

Preferably the temperature of the mixture during steps (b), (c), and (d) does not exceed about 90 degrees C.

Preferably the temperature of the mixture during step (e) does not exceed about 80 degrees C. and more preferably does not exceed 50 degrees C.

Preferably the epoxy compound(s) has an equivalent weight of about 160 to about 210.

The present invention also provides a curable composition comprising:

(a) the curing agent composition of the single step method;

(b) an epoxy compound(s) having an average of greater than 1 vicinal epoxy group per molecule; and (c) an optional epoxy co-curing agent(s);

wherein about 0.1 to about 20 weight percent of the curing agent composition of (a) is present based on the total weight of the curable composition.

The present invention also provides the above curable composition which has been cured.

The present invention also provides a multiple step method of preparing a curing agent composition comprising the steps of:

(a) providing a mixture having a temperature range of about 15 to about 50 degrees C., the mixture consisting essentially of:

(i) a first charge of an epoxy compound(s) having an average of at least one vicinal epoxy group per molecule and an epoxy equivalent weight of less than about 350, wherein if the epoxy compound is water insoluble it must have a ball and ring softening point of about 40 degrees C. or less;

(ii) an imidazole compound(s) selected from the group consisting of

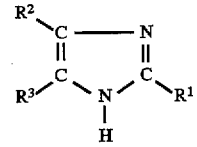

wherein
$R^1$ is independently selected from the group consisting of hydrogen, aryl radicals, alkyl radicals comprising up to about 18 carbon atoms, and cycloalkyl radicals comprising up to about 18 carbon atoms;
$R^2$ is independently selected from the group consisting of hydrogen, aryl radical, alkyl radicals comprising up to about 18 carbon atoms, and cycloalkyl radicals comprising up to about 18 carbon atoms;
$R^3$ is independently selected from the group consisting of hydrogen, aryl radicals, alkyl radicals comprising up to about 18 carbon atoms, and cycloalkyl radicals comprising up to about 18 carbon atoms;
wherein $R^2$ and $R^3$ may alternatively together form a fused ring structure; and (iii) at least about 5 percent by weight water, based on the total weight of components of elements (i) plus (ii) plus (iii);

(b) agitating the mixture and allowing the mixture to react, wherein optionally the mixture is heated to accelerate reaction, wherein the amount of heat optionally added and the amount of epoxy compound added in step (a) is such that mixture temperature during reaction in step (b) does not exceed about 110 degrees C., wherein sufficient water is added in step (a) such that at least about 5 percent by weight water is present based upon the total weight of the mixture during step (b);

(c) optionally adding to the mixture an additional charge of an epoxy compound(s) having at least one vicinal epoxy group per molecule and an epoxy equivalent weight of less than about 350, wherein if the epoxy compound is water insoluble it must have a ball and ring softening point of about 40 degrees C. or less, after cooling the mixture, if necessary, to achieve a temperature range of about 15 to about 50 degrees C. and allowing the mixture to react wherein optionally the mixture is heated to accelerate the reaction, wherein the amount of epoxy compound(s) added in step (c) and the amount of heat optionally added in step (c) is such that the temperature of the mixture of step (c) during reaction does not exceed about 110 degrees C., and wherein agitation is maintained throughout step (c);

(d) optionally repeating step (c) one or more times if desired;

(e) continuing agitation of the mixture and cooling, if necessary, to obtain a temperature range of the mixture of about 15 to about 50 degrees C., and adding a final charge of an epoxy compound(s) having at least one vicinal epoxy group per molecule and an epoxy equivalent weight of less than about 350, wherein if the epoxy compound is water insoluble it must have a ball and ring softening point of about 40 degrees C. or less, and heating the mixture to a temperature not to exceed about 110 degrees to cause the mixture to further react to form a curing agent composition in water;

(f) optionally extracting from the mixture unreacted water soluble imidazole compounds;

(g) optionally repeating step (f) one or more times; and (h) removing water from the mixture at a temperature not to exceed about 110 degrees C. to yield a curing agent composition;

wherein the total amount of the epoxy compound(s) and the imidazole compound(s) used according to the method is such that about 0.55 to about 1.3 equivalents of secondary amino group of imidazole compound(s) per equivalent of epoxy group are used;

wherein water is added to the mixture, if necessary, in one or more of the following steps: (c), (d), (e) in order that at least about 5 percent by weight water is present based upon the total weight of the mixture during optional step (c), if included, optional step (d), if included, and step (e).

The present invention also provides the curing agent composition(s) formed according to the multiple step method.

Preferably the amount of water used in the multiple step method ranges from about 14 to about 25 percent by weight based upon the total weight of components of the epoxy compound(s), plus the imidazole compound(s) plus water.

Preferably the epoxy compound(s) used in the multiple step method has at least one aromatic ring as part of the epoxy compound(s) structure and an equivalent weight of 160 to about 210.

Preferably the temperature of the mixture during steps (b), (c), (d), (e), (f), and (g) of the multiple step method does not exceed about 90 degrees C.

Preferably the temperature of the mixture during step (h) does not exceed about 80 degrees C. and more preferably does not exceed 50 degrees C.

The present invention also provides a curable composition comprising:

(a) the curing agent composition of the multiple step method;

(b) an epoxy compound(s) having an average of greater than 1 vicinal epoxy group per molecule; and (c) an optional epoxy co-curing agent(s);

wherein about 0.1 to about 20 weight percent of the curing agent composition of (a) is present based on the total weight of the curable composition.

The present invention also provides the above curable composition(s) which have been cured.

The present invention also provides a curing agent composition comprising the reaction product of a mixture comprising an imidazole compound(s) selected from the group consisting of

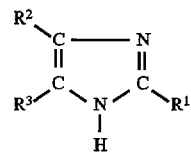

wherein $R^1$ is independently selected from the group consisting of hydrogen, aryl radicals, alkyl radicals comprising up to about 18 carbon atoms, and cycloalkyl radicals comprising up to about 18 carbon atoms;

$R^2$ is independently selected from the group consisting of hydrogen, aryl radicals, alkyl radicals comprising up to about 18 carbon atoms, and cycloalkyl radicals comprising up to about 18 carbon atoms;

$R^3$ is independently selected from the group consisting of hydrogen, aryl radicals, alkyl radicals comprising up to about 18 carbon atoms, and cycloalkyl radicals comprising up to about 18 carbon atoms;

wherein $R^2$ and $R^3$ may alternatively together form a fused ring structure;

an epoxy compound(s) having an average of at least one vicinal epoxy group per molecule and an epoxy equivalent weight of less than about 350, wherein if the epoxy compound is water insoluble it must have a ball and ring softening point of about 40 degrees C. or less; and water;

wherein the curing agent composition has quaternary imidazolium internal segment(s).

The present invention also provides the curing agent composition of as described above wherein the total amount of the epoxy compound(s) and the imidazole compound(s) is such that about 0.55 to about 1.3 equivalents of secondary amino group of imidazole compound(s) per equivalent of epoxy group are present in the mixture.

The present invention also provides a curable composition comprising:

(a) the curing agent composition of described above;

(b) an epoxy compound(s) having an average of greater than 1 vicinal epoxy group per molecule; and (c) an optional epoxy co-curing agent(s);

wherein about 0.1 to about 20 weight percent of the curing agent composition of (a) is present based on the total weight of the curable composition.

The present invention also provides the cured composition as described above.

The present invention also provides the curing agent composition as described above comprising preferably 9 to 40 and more preferably 15 to 40 equivalents percent epoxy residues in the quaternary imidazolium segment(s) of the compound(s) having a quaternary imidazolium internal segment(s), based on 100% total epoxy equivalent.

DETAILED DESCRIPTION OF THE INVENTION

Epoxy Compounds for Curing Agent Compositions

Suitable epoxy compounds have an average of at least one vicinal epoxy group per molecule and an epoxy equivalent weight of less than about 350, wherein if the epoxy compound(s) is water insoluble, it must have a ball and ring softening point of about 40 degrees C. (refer to ASTM E28-67) or less. Polyglycidyl ethers of polyhydric phenols are preferably used. Typical examples of polyglycidyl ethers of a polyhydric phenols are diglycidyl ether of bisphenol A such as Epon™ 828 marketed by Shell Chemical, and diglycidyl ether of bisphenol F such as Epon™ 862, also marketed by Shell Chemical. Another example would be polyglycidyl ethers of substituted and unsubstituted phenolic novolac compounds such as Ciba Geigy ECN 1235. Examples of other epoxy resins include glycidylated aminophenol compounds such as MY 0510 from Ciba Geigy and hydantoin diepoxides such as XU 238 from Ciba Geigy.

Imidazole Compounds

Imidazole compounds suitable for the preparation of the curing agent compositions of the invention contain a secondary amino group in the imidazole ring. Suitable candidates can be represented by the formula:

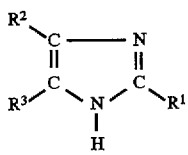

wherein
$R^1$ is independently selected from the group consisting of hydrogen, aryl radicals, alkyl radicals comprising up to about 18 carbon atoms, and cycloalkyl radicals comprising up to about 18 carbon atoms;
$R^2$ is independently selected from the group consisting of hydrogen, aryl radicals, alkyl radicals comprising up to about 18 carbon atoms, and cycloalkyl radicals comprising up to about 18 carbon atoms;
$R^3$ is independently selected from the group consisting of hydrogen, aryl radicals, alkyl radicals comprising up to about 18 carbon atoms, and cycloalkyl radicals comprising up to about 18 carbon atoms;
wherein $R^2$ and $R^3$ may alternatively together form a fused ring structure;

Representative examples of suitable imidazole compounds falling within the above formula include imidazole, 2-methylimidazole, 4-methylimidazole, 5-methylimidazole, 2-heptadecylimidazole, 2-phenylimidazole, 2,4-dimethylimidazole, 2-ethyl-4-methylimidazole, 4-butyl-5-ethylimidazole, 2-cyclohexyl-4-methylimidazole, 2-ethyl-4-phenylimidazole, benzimidazole and mixtures thereof.

Other suitable imidazoles falling within the above formula suitable for making the curing agent compositions are benzimidazoles of the formula

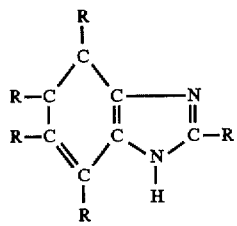

wherein each R independently denotes a halogen atom, a hydrocarbon radical, such as, preferably an alkyl or cycloaliphatic radical of up to about 12 carbon atoms or aryl radicals such as phenyl, tolyl, xylyl, etc., or more preferably a hydrogen atom.

Water

Water is an essential component of the invention in that it facilitates the reaction of two epoxy groups with one imidazole compound to form internal quaternary imidazolium segment(s). Deionized water is most preferred according to the method of the invention. Softened water is less preferred. Tap water is acceptable. The most preferred amount of water is about 14 to 25% based on the total weight of the mixture. Acceptable amounts of water include a minimum of at least 5% in the mixture up to virtually any practical maximum. The use of a huge excess of water becomes economically unfeasible but is otherwise a workable embodiment of this invention.

Process Equipment

Suitable batch reactor vessels include, for example, any glass, glass coated, or metal vessels equipped with agitator devices which are capable of stirring fluid mixtures having viscosities ranging up to about 2000 poise, and are capable of being heated and cooled. A preferred batch reactor is a vented vessel fabricated of stainless steel and having a stainless steel turbine agitator, a jacket for circulating heating and cooling fluids and vapors, a vacuum source capable of reducing the internal reactor pressure to 0.1 bar (76 mm Hg) or lower, an overhead condenser and decanter, vent, a pressure relief device, charging and draining ports, a nitrogen source for inerting and pressurizing the reactor as desired, and suitable controls for measuring, adjusting, and controlling batch temperature, internal pressure, and agitation.

Process Parameters

To maximize the formation of the desired curing agent compositions and minimize the unwanted epoxy homopolymerization reaction, typically the prereaction mixture is prepared wherein the water is charged first, then the imidazole(s) is slurried into the water. Lastly, the epoxy component is added as rapidly as possible with strong agitation. In this manner, the desired reaction products are maximized.

The prereaction mixture is provided at a temperature range of about 15 to about 50 degrees C. Temperatures below about 15 degrees C. lead to increased viscosity and decreased miscibility of the reactants and difficulty in achieving suitable prereaction mixtures. Temperatures above 50 degrees C. during formation of the prereaction mixture and during subsequent optional or non-optional epoxy compound(s) charging steps lead to excessive homopolymer formation. Temperatures above 110 degrees C. during curing agent composition formation, and drying reduce the latency properties of the curing agent composition of the invention. Excess water soluble imidazole compounds can be removed from the reaction mixture using split phase extraction methods with water for example.

Inerting a vented reaction vessel with nitrogen gas throughout the process is the preferred procedure. Air may interfere slightly with amine reactivity and does not inert the reaction environment, but otherwise is an acceptable atmosphere. Atmospheric pressure inside the reactor to typically maintained except when vacuum is optionally pulled to facilitate water removal.

The use of imidazole secondary amine to epoxy equivalents ratios below 0.55 causes excessive epoxy homopolymerization which causes high viscosity or gellation of the adduct(s). The use of secondary amine to epoxy equivalents ratios above 1.3 results in increased curing activity at temperatures below about 50 degrees C. with resultant reductions in storage life of the curable compositions.

Curable Compositions

Curable compositions may be prepared using the curing agent composition(s) of the invention. These curable compositions have a variety of uses. Suitable curable composition(s) comprise:

(a) the curing agent composition of the invention;

(b) an epoxy compound(s) having an average of greater than 1 vicinal epoxy group per molecule; and (c) an optional epoxy co-curing agent(s);

wherein about 0.1 to about 20 weight percent of the curing agent composition of (a) is present based on the total weight of the curable composition.

Co-Curing Agents

Co-curing agents are epoxy curing agents which can be used in conjunction with the curing agent compositions of the invention to facilitate the cure of epoxy resins. The curing agent compositions of the invention comprising imidazole adducts can be used in combination with co-curing agent(s) such as phenolic compounds, mercaptans, polycarboxylic acids and their anhydrides, amino compounds, amine salts, and quaternary ammonium salts. Examples of suitable amines that can be used in combination with the curing agent compositions are aliphatic monoamines such as dimethylethanol amine, methyldiethanol amine, morpholine, stearyldimethyl amine, tri-n-hexylamine; aliphatic polyfunctional amino compounds such as ethylene diamine, diethylenetriamine, N,N-dimethyl aminopropylamine, dicyandiamide, guanidine, and amidines; cycloaliphatic amines such as di(4-aminocyclohexyl)methane, di(3-methyl-4-aminocyclohexyl)methane, and 1-amino-e-aminomethyl-3,5,5-trimethyl cyclohexane (isophorone diamine); aromatic amines such as p,p'-bis-(aminophenol)methane, p,p'-bis (aminophenyl)sulphone, m-phenylenediamine, and heterocyclic amino compounds such as melamine. Polycarboxylic acid anhydrides that can be used as co-curing agent are: phthalic anhydride, tetrahydrophthalic, anhydride, hexahydrophthalic anhydride, bicyclo-2,2,1-heptene-2,3-dicarboxylic anhydride, methyl bicyclo-2,2,1-heptene-2,3-dicarboxylic anhydride isomers, 1,4,5,6,7,7-hexachloro-bicyclo 2,2,1-5-heptene-2-3-dicarboxylic anhydride, succinic anhydride, alkenyl succinic anhydrides, pyromellitic dianhydride, 3,3',4,4'-benzophenone tetracarboxylic dianhydride, trimellitic anhydride and partial esters thereof with ethylene glycol and glycerol. Mixtures of two or more polycarboxylic anhydrides may also be used. Suitable phenolic compounds include, for example, bisphenols such as, bisphenol A and phenolic/epoxy adducts such as DEH87 marketed by Dow Chemical. Other phenolic compounds include novolak compounds such as Durite™ SD 1701 phenolic novolac.

The above-noted co-curing agents are generally employed in amounts varying according to the nature and the equivalent weights of co-curing agent and epoxy resins. Polycarboxylic acid anhydrides are preferably used in a ratio higher than 0.8, usually between 1.0 and 2.3, acid equivalents per epoxide equivalent. Amino compounds having more than one hydrogen atom attached to nitrogen are preferably used in a ratio from 0.8 to 1.2 active hydrogen equivalents per epoxide equivalent.

Mercaptans useful as co-curing agents are preferably liquid polymercapto-polysulphides such as compounds having the general structure

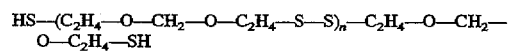

having number average molecular weights of 500 to 1000; such mercaptans are preferably used in amounts of 25 to 100 parts by weight per 100 parts by weight of epoxy compound (s).

Epoxy Compounds for Curable Compositions

Epoxy compounds useful in the curable compositions of the invention are those which have an average of greater than one vicinal epoxy group per molecule (i.e polyglycidyl compounds). They may be used singly or in a mixture of two or more. The epoxy compounds may be water soluble or water insoluble. Polyglycidyl ethers of polyhydric phenols are preferably used. Typical examples of polyglycidyl ethers of a polyhydric phenols are diglycidyl ether of bisphenol A such as Epon™ 828 marketed by Shell Chemical, and diglycidyl ether of bisphenol F such as Epon™ 862, also marketed by Shell Chemical. Another example would be polyglycidyl ethers of substituted and unsubstituted phenolic novolac compounds such as Ciba Geigy ECN 1235. Examples of other epoxy resins include glycidylated amino alcohol compounds and aminophenol compounds such as MY 0510 from Ciba Geigy, hydantoin diepoxides such as XU 238 from Ciba Geigy, polyglycidyl ethers of aliphatic polyhydric compounds such as DER 732 from Dow Chemical, and polyglycidyl esters of polycarboxylic acids, for example Epon™ 871 from Shell Chemical. Still other examples of suitable epoxy resins include various cyclohexene oxide-containing molecules such as ERL 4221 from Union Carbide and epoxies derived from reaction of peracetic acid with olefinic compounds.

The following abbreviations are used herein;

comp.=comparative ex.=example equiv.=equivalent sec.=seconds rpm=revolutions per minute

EXAMPLES

The following examples further illustrate but do not limit the present invention. All parts, percentages, ratios, etc., in the examples and elsewhere herein are by weight unless specified otherwise.

Ring and Ball Softening Point

The ring and ball softening point of a material is determined according to ASTM test method E28-67, incorporated by reference herein. The softening point is defined as the temperature at which a disk of the sample held within a horizontal ring is forced downward a distance of 2.54 cm under the weight of a steel ball as the sample is heated at a prescribed rate in a water or glycerin bath.

In a typical determination, a 25–50 g sample of material is heated above its melting point and poured into a preheated brass ring (1.9 cm outside diameter×1.6 cm inside diameter) until the ring is completely full. The resin filled ring is allowed to cool until the sample solidifies, then is positioned 2.54 cm above a receiving plate in a stirred ethylene glycol bath which also contains an ASTM High Softening Point Thermometer. A 9.5 mm diameter steel ball weighing between 3.45 and 3.55 g is placed on the sample in the ring, and the ethylene glycol bath is heated at a rate of not more than 5° C. per minute. The softening point is determined as the temperature at which the sample touches the receiving plate.

EXAMPLE 1

Multistep preparation of a curing agent composition 300 grams 2-methylimidazole was added with stirring to 150 grams of deionized water in a 2000 ml flask equipped with a thermometer and kept at 40° C. 200 grams Shell Epon™ 828 epoxy was added with stirring to the 40° C. imidazole/water mixture and then heated to 60° C. using a hot plate set at 80° C. A reaction occurred which caused an exotherm. The heat source was removed and air cooling initiated using a heat gun. The exotherm peaked at 90° C. and the reaction mixture was then cooled to 40° C. A second charge of 200 grams epoxy was added with stirring and heated to 60° C. where a reaction occurred which caused an exotherm. The heat source was removed and air cooling initiated. The exotherm peaked at 80° C. and the reaction mixture was cooled to 50° C. A final charge of 200 grams epoxy was added with stirring and heated to 60° C. where a reaction occurred which caused an exotherm. The heat source was left in place and no air cooling initiated. The reaction exotherm peaked at 87° C. and the reaction mixture was then poured into an aluminum tray for cooling. The curing agent composition was dried in a vacuum oven at a reduced pressure of less than 30 mm Hg at a temperature setting of 50° C. Product was a solid at 25° C.

EXAMPLE 2

Single step preparation of a curing agent composition 200 grams Shell Epon™ 828 epoxy, 100 grams 2-methylimidazole, and 53 grams deionized water were charged into a 1-liter split resin flask equipped with a stirrer, vacuum pump, and heating mantle. The mixture was continuously stirred under a reduced pressure of less than 30 mm Hg and the temperature elevated using a Therm-o-watch™ controller set at 80% output. At 60° C. a reaction occurred which caused an exotherm which peaked at 105° C. A simultaneous drop in temperature and increase in viscosity resulted in an inability to continue stirring. The heating mantle was removed and vacuum continued for 2 hours. The curing agent composition was a solid at 25° C.

EXAMPLE 3

Single step preparation of a curing agent composition 100 grams Shell Epon™ 828, 87.8 grams 2-phenylimidazole, and 300 grams deionized water were mixed in a 1000 ml flask equipped with a thermometer. Using a hot plate, the mixture was heated to 70° C. where a reaction occurred which caused an exotherm that peaked at 102° C. The reaction mixture was then poured into an aluminum tray for cooling. The product was dried in a vacuum oven under a reduced pressure of less than 30 mm Hg at a temperature setting of 50° C. Product was a solid at 25° C.

EXAMPLE 4

Single step preparation of a curing agent composition 20 grams Shell Epon™ 828, 8.3 grams imidazole, and 5 grams deionized water were mixed in a 250 ml flask equipped with a thermometer. Using a hot plate, the mixture was heated to 70° C. where a reaction occurred which caused an exotherm that peaked at 95° C. The reaction mixture was then poured into an aluminum tray for cooling. The product was dried in a vacuum oven under a reduced pressure of less than 30 mm Hg at a temperature setting of 50° C. Product was solid at 25° C.

EXAMPLE 5

Large scale, multi-step preparation of a curing agent composition.

To a jacketed 15000 liter stainless steel reactor equipped with a stainless steel turbine agitator, a vacuum source, and an overhead water cooled condenser with a decanter, was charged 1667 kg of deionized water. The agitator was started and adjusted to 80 RPM which was maintained throughout the entire run, except during sampling. 3112 kg of 97+% pure 2-methylimidazole from BASF was charged to the reactor. The batch temperature was adjusted to 34° C. and 2102 kg of Shell Epon™ 828 liquid epoxy resin (preheated to 54° C.) was charged over 18 minutes. The batch temperature rose to 37° C. against maximum cooling during the charging of the epoxy resin. The reactor was closed and the batch exothermed to a peak temperature of 97° C. in six minutes. The batch was cooled to 29° C. and a second 2102 kg charge of Epon™ 828 epoxy (preheated to 54° C.) was added over 18 minutes. The batch temperature rose to 42° C. against maximum cooling during this second charge. The reactor was closed and the batch exothermed to a peak temperature of 88° C. The batch was cooled to 32° C. and a third 2102 kg charge of Epon™ 828 epoxy (preheated to 54° C.) was added over 14 minutes. The batch temperature rose to 34° C. against maximum cooling during this third charge. The reactor was closed and the batch exothermed to a peak temperature of 68° C. The batch was sampled for appearance and was observed to be a viscous, off-white, homogeneous liquid. Sampled material was dried in a vacuum oven at a reduced pressure of less than 30 mm Hg at a temperature setting of 50° C. Product was a solid at 25° C.

COMPARATIVE EXAMPLE 1

To a jacketed 15000 liter stainless steel reactor equipped with a stainless steel turbine agitator, a vacuum source, and an overhead water cooled condenser with a decanter, was charged 1667 kg of deionized water. The agitator was started and adjusted to 80 RPM which was maintained throughout the entire run, except during sampling. 3112 kg of 97+% pure 2-methylimidazole from BASF was charged to the reactor. The batch temperature was adjusted to 34° C. and 2102 kg of Shell Epon™ 828 liquid epoxy resin (preheated to 54° C.) was charged over 18 minutes. The batch temperature rose to 37° C. against maximum cooling during the charging of the epoxy resin. The reactor was closed and the batch exothermed to a peak temperature of 97° C. in six minutes. The batch was cooled to 29° C. and a second 2102 kg charge of Epon™ 828 epoxy (preheated to 54° C.) was added over 18 minutes. The batch temperature rose to 42° C. against maximum cooling during this second charge. The reactor was closed and the batch exothermed to a peak temperature of 88° C. The batch was cooled to 32° C. and a third 2102 kg charge of Epon™ 828 epoxy (preheated to 54° C.) was added over 14 minutes. The batch temperature rose to 34° C. against maximum cooling during this third charge. The reactor was closed and the batch exothermed to a peak temperature of 68° C. The batch was sampled for appearance and was observed to be a viscous, off-white, homogeneous liquid. The reactor was closed and the batch was heated to commence water removal. At a batch temperature of 110° C., boiling was vigorous. Several decanters of water were removed, during which time the batch temperature rose gradually to 130° C. At 130° C. vacuum was pulled to 30 mm Hg to remove the remaining water from the batch. Heating was continued under vacuum until the batch temperature reached 160° C. The batch was sampled for appearance and viscosity, and draining was commenced. The sample was observed to be dark red in appearance with a viscosity at 120° C. of 36800 cps as measured by Brookfield model RVTD digital viscometer equipped with a Thermosel unit.

C-13 NMR Spectroscopy

Samples of curing agent compositions were dissolved in DMSO-d6 with Cr(AcAc)₃ and analyzed by quantitative C-13 NMR spectroscopy. A comparison was made using Shell Epicure™ P-100. Results are reported in Table I below as percent of epoxy equivalents reacted to form quaternary imidazolium internal segment(s), based on 100% total epoxy equivalent(s).

TABLE I

C-13 NMR Analysis for Internal Quarternary Imidazolium Content

| Sample | % Epoxy Equiv. |
|---|---|
| Epicure™ P-100 | 0.0 |
| Comp. Ex. 1 | 9.0 |
| Ex. 2 | 22.2 |
| Ex. 3 | 34.9 |
| Ex. 4 | 26.6 |
| Ex. 5 | 26.0 |

EXAMPLES 6–9 AND COMPARATIVE EXAMPLES 2–3

Gel time measurement

A sample of curing agent, with and without dicyandiamide co-curing agent, was added to Shell Epon™ 2004 epoxy, ground into a powder composition, spread, and gently stirred with a spatula on a heated planar surface maintained at 240° C. Initially the powder sample melts and coalesces. Within a few seconds the molten resin began to cure to a thermoset condition. The gel time was recorded at the point where the composition solidified. A comparative example was prepared using Shell Epicure™ P-101 as the curing agent. Table II below shows the parts by weight of each epoxy resin and the amount of co-curing agent used in each formulation. Also reported is the gel time for each formulation.

TABLE II

Gel Times

| Example | Epon™ 2004 | Epicure™ P-101 | Ex. 5 | Ex. 3 | Dicyandi-amide | Gel Time (sec) |
|---|---|---|---|---|---|---|
| Comp. Ex. 2 | 98 | 2 | | | | 44.6 |
| Ex. 6 | 98 | | 2 | | | 22.9 |
| Ex. 7 | 98 | | | 2 | | 61.4 |
| Comp. Ex. 3 | 96 | 2 | | | 2 | 6.9 |
| Ex. 8 | 96 | | 2 | | 2 | 7.8 |
| Ex. 9 | 96 | | | 2 | 2 | 10.3 |

EXAMPLES 10–11 AND COMPARATIVE EXAMPLES 4–5

Rate of Viscosity Increase

A sample of curing agent of the invention was added to Shell Epon™ 834 epoxy and placed in a Brookfield, model RVTD, Digital Viscometer equipped with a Thermosel™ unit set at 40° C. and 1 rpm using a #27 spindle. A comparative example was prepared by using Shell Epicure™ P-100 or comparative example 1 as the curing agent. Table III below shows the parts by weight of each epoxy resin and the amount of curing agent used in each formulation. Also reported is the rate of viscosity increase for each formulation as determined by the following equation;

Rate of viscosity increase=(Final viscosity—Initial viscosity)÷(Time)

TABLE III

Rate of Viscosity Increase

| Example | Epon™ 834 | Epicure™ P-100 | Comp. 1 | Ex. 5 | Ex. 3 | Viscosity Increase (cps/hr) |
|---|---|---|---|---|---|---|
| Comp. Ex. 4 | 98 | 2 | | | | 11900 |
| Comp. Ex. 5 | 98 | | 2 | | | 5250 |
| Ex. 10 | 98 | | | 2 | | 806 |
| Ex. 11 | 98 | | | | 2 | 0 |

The results from the preceding examples demonstrate a method(s) for preparing novel epoxy curing agent compositions. The novel curing agent(s) of the invention facilitate the cure of epoxy resins at appropriate curing temperatures yet are relatively inactive at lower temperatures as demonstrated by the reduced rate of viscosity increase at 40° C.

While this invention has been described in connection with specific embodiments, it should be understood that it is capable of further modification. The claims herein are intended to cover those variations which one skilled in the art would recognize as the equivalent of that has been described herein.

It is claimed:

1. A curable composition comprising:
   (a) a curing agent composition prepared according to a method comprising the steps of:
      (A) providing a mixture having a temperature in the range from about 15 to about 50 degrees C., the mixture consisting essentially of:
         (i) an epoxy compound having an average of at least one vicinal epoxy group per molecule and an epoxy equivalent weight of less than about 350, wherein if the epoxy compound is water insoluble it must have a ball and ring softening point of about 40 degrees C. or less;
         (ii) an imidazole compound(s) selected from the group consisting of

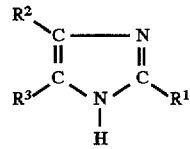

wherein
   $R^1$ is independently selected from the group consisting of hydrogen, aryl radicals, alkyl radicals comprising up to about 18 carbon atoms, and cycloalkyl radicals comprising up to about 18 carbon atoms;
   $R^2$ is independently selected from the group consisting of hydrogen, aryl radicals, alkyl radicals comprising up to about 18 carbon atoms, and cycloalkyl radicals comprising up to about 18 carbon atoms;
   $R^3$ is independently selected from the group consisting of hydrogen, aryl radicals, alkyl radicals comprising up to about 18 carbon atoms, and cycloalkyl radicals comprising up to about 18 carbon atoms;
   wherein $R^2$ and $R^3$ may alternatively together form a fused ring structure; and
         (iii) at least about 5 percent by weight water based on the total weight of components of elements (i) plus (ii) plus (iii);

(B) allowing the mixture to react with agitation and with optional heating in order to accelerate the reaction, wherein the amount of water added in step (A) and the amount of heat optionally added in step (B) is such that the mixture temperature does not exceed about 110 degrees, in order to yield a curing agent composition in water, and wherein the amount of water added in step (A) is such that at least about 5 weight percent water is present based upon the total weight of the mixture during step (B);

(C) optionally extracting from the mixture unreacted water soluble imidazole compounds;

(D) optionally repeating step (C) one or more times;

(E) removing the water at a temperature not to exceed about 110 degrees C. to yield the curing agent composition;

wherein the total amount of epoxy compound(s) and imidazole compound(s) used according to the method is such that about 0.55 to about 1.3 equivalents of secondary amino group of the imidazole compound(s) per equivalent of epoxy group are used;

(b) an epoxy compound(s) having an average of greater than 1 vicinal epoxy group per molecule; and (c) an optional epoxy co-curing agent(s);

wherein about 0.1 to about 20 weight percent of the curing agent composition of (a) is present based on the total weight of the curable composition.

2. The cured composition of claim 1.

3. The curable composition of claim 1 wherein the epoxy compound is selected from the group consisting of a diglycidyl ether of bisphenol A, a polyglycidyl ether of a phenolic novolac compound, a glycidylated amino phenol compound, a triglycidyl isocyanuric acid, a hydantoin diepoxide, a polyglycidyl ether of an aliphatic polyhydric compound, a polyglycidyl ester of a polycarboxylic acid, a cyclohexene oxide-containing molecule, and an epoxy derived from reaction of peracetic acid with an olefinic compound.

4. The curable composition of claim 1 wherein the epoxy co-curing agent is selected from the group consisting of phenolic compounds, mercaptans, polycarboxylic acids and their anhydrides, amino compounds, amine salts, and quaternary ammonium salts.

5. The curable composition of claim 1 wherein the epoxy compound comprises a polyglycidyl ether of a polyhydric phenol.

6. A curable composition comprising:

(a) a curing agent composition prepared according to a method comprising the steps of:

(A) providing a mixture having a temperature in the range from about 15 to about 50 degrees C., the mixture consisting essentially of:

(i) a first charge of an epoxy compound(s) having an average of at least one vicinal epoxy group per molecule and an epoxy equivalent weight of less than about 350, wherein if the epoxy compound is water insoluble it must have a ball and ring softening point of about 40 degrees C. or less;

(ii) an imidazole compound(s) selected from the group consisting of

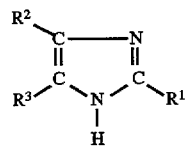

wherein

R¹ is independently selected from the group consisting of hydrogen, aryl radicals, alkyl radicals comprising up to about 18 carbon atoms, and cycloalkyl radicals comprising up to about 18 carbon atoms;

R² is independently selected from the group consisting of hydrogen, aryl radical, alkyl radicals comprising up to about 18 carbon atoms, and cycloalkyl radicals comprising up to about 18 carbon atoms;

R³ is independently selected from the group consisting of hydrogen, aryl radicals, alkyl radicals comprising up to about 18 carbon atoms, and cycloalkyl radicals comprising up to about 18 carbon atoms;

wherein R² and R³ may alternatively together form a fused ring structure: and (iii) at least about 5 percent by weight water, based on the total weight of components of elements (i) plus (ii) plus (iii);

(B) agitating the mixture and allowing the mixture to react, wherein optionally the mixture is heated to accelerate reaction, wherein the amount of heat optionally added and the amount of epoxy compound added in step (A) is such that mixture temperature during reaction in step (B) does not exceed about 110 degrees C., wherein sufficient water is added in step (A) such that at least about 5 percent by weight water is present based upon the total weight of the mixture during step (B);

(C) optionally adding to the mixture an additional charge of an epoxy compound(s) having at least one vicinal epoxy group per molecule and an epoxy equivalent weight of less than about 350, wherein if the epoxy compound is water insoluble it must have a ball and ring softening point of about 40 degrees C. or less, after cooling the mixture, if necessary, to achieve a temperature range of about 15 to about 50 degrees C. and allowing the mixture to react wherein optionally the mixture is heated to accelerate the reaction, wherein the amount of epoxy compound(s) added in step (C) and the amount of heat optionally added in step (C) is such that the temperature of the mixture of step (C) during reaction does not exceed about 110 degrees C., and wherein agitation is maintained throughout step (C);

(D) optionally repeating step (C) one or more times if desired;

(E) continuing agitation of the mixture and cooling, if necessary, to obtain a temperature range of the mixture of about 15 to about 50 degrees C., and adding a final charge of an epoxy compound(s) having at least one vicinal epoxy group per molecule and an epoxy equivalent weight of less than about 350, wherein if the epoxy compound is water insoluble it must have a ball and ring softening point of about 40 degrees C. or less, and heating the mixture to a temperature not to exceed about 110 degrees to cause the mixture to further react to form a curing agent composition in water;

(F) optionally extracting from the mixture unreacted water soluble imidazole compounds;

(G) optionally repeating step (F) one or more times; and (H) removing water from the mixture at a temperature not to exceed about 110 degrees C. to yield a curing agent composition;

wherein the total amount of the epoxy compound(s) and the imidazole compound(s) used according to the method is such that about 0.55 to about 1.3 equivalents of secondary amino group of imidazole compound(s) per equivalent of epoxy group are used;

wherein water is added to the mixture, if necessary, in one or more of the following steps: (C), (D), (E) in order that at least about 5 percent by weight water is present based upon the total weight of the mixture during optional step (C), if included, optional step (D), if included, and step (E);

(b) an epoxy compound(s) having an average of greater than 1 vicinal epoxy group per molecule; and (c) an optional epoxy co-curing agent(s);

wherein about 0.1 to about 20 weight percent of the curing agent composition of (a) is present based on the total weight of the curable composition.

7. The cured composition of claim 6.

8. The curable composition of claim 6 wherein the epoxy compound is selected from the group consisting of a diglycidyl ether of bisphenol A, a polyglycidyl ether of a phenolic novolac compound, a glycidylated amino phenol compound, a triglycidyl isocyanuric acid, a hydantoin diepoxide, a polyglycidyl ether of an aliphatic polyhydric compound, a polyglycidyl ester of polycarboxylic acid, a cyclohexene oxide-containing molecule, and an epoxy derived from reaction of peracetic acid with all olefinic compound.

9. The curable composition of claim 6 wherein the epoxy co-curing agent is selected from the group consisting of phenolic compounds, mercaptans, polycarboxylic acids and their anhydrides, amino compounds, amine salts, and quaternary ammonium salts.

10. The curable composition of claim 6 wherein the epoxy compound comprises a polyglycidyl ether of a polyhydric phenol.

11. A curable composition comprising:

(a) a curing agent composition comprising the reaction product of:

a mixture comprising an imidazole compound(s) selected from the group consisting of

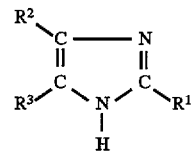

wherein $R^1$ is independently selected from the group consisting of hydrogen, aryl radicals, alkyl radicals comprising up to about 18 carbon atoms, and cycloalkyl radicals comprising up to about 18 carbon atoms;

$R^2$ is independently selected from the group consisting of hydrogen, aryl radicals, alkyl radicals comprising up to about 18 carbon atoms, and cycloalkyl radicals comprising up to about 18 carbon atoms;

$R^3$ is independently selected from the group consisting of hydrogen, aryl radicals, alkyl radicals comprising up to about 18 carbon atoms, and cycloalkyl radicals comprising up to about 18 carbon atoms;

wherein $R^2$ and $R^3$ may alternatively together form a fused ring structure;

an epoxy compound(s) having an average of at least one vicinal epoxy group per molecule and an epoxy equivalent weight of less than about 350, wherein if the epoxy compound is water insoluble it must have a ball and ring softening point of about 40 degrees C. or less; and water;

wherein the curing agent composition has a quaternary imidazolium internal segment(s);

(b) an epoxy compound(s) having an average of greater than 1 vicinal epoxy group per molecule; and (c) an optional epoxy co-curing agent(s);

wherein about 0.1 to about 20 weight percent of the curing agent composition of (a) is present based on the total weight of the curable composition.

12. The cured coating composition of claim 11.

* * * * *